June 6, 1933.   L. E. CHURCH   1,912,512
INTEGRATING ORIFICE METER
Filed Aug. 24, 1931   2 Sheets-Sheet 1

Inventor
Lloyd E. Church,
By Robt E. Barry
Attorney

June 6, 1933.　　　　L. E. CHURCH　　　　1,912,512
INTEGRATING ORIFICE METER
Filed Aug. 24, 1931　　　2 Sheets-Sheet 2

Inventor
Lloyd E. Church,
By Robt. E. Barry
Attorney

Patented June 6, 1933

1,912,512

UNITED STATES PATENT OFFICE

LLOYD E. CHURCH, OF WHITTENBURG, TEXAS, ASSIGNOR TO PHILLIPS PETROLEUM COMPANY, OF BARTLESVILLE, OKLAHOMA, A CORPORATION OF DELAWARE

INTEGRATING ORIFICE METER

Application filed August 24, 1931. Serial No. 559,091.

This invention relates to improvements in integrating orifice meters or the like, and the primary object of the invention is to provide a device which may be attached to or built in to the conventional type orifice meter for the purpose of progressively and continuously computing and registering the equation; square root of the aggregate differential pressure in inches of water, times static pressure in pounds per square inch absolute or $$\sqrt{hP}$$

where $h$ equals differential pressure in inches of water, and $P$ equals static pressure in pounds per square inch absolute. This product is known as the pressure extension and when multiplied by the coefficient of flow conditions, will result in the unit volume of gas or other gaseous fluid passing through the orifice for that period of time the integrator has been in operation.

Another object is to provide a device of this character, wherein the meter is arranged to carry the conventional chart upon which is recorded permanently the differential and static pressure for 24 hour periods.

A still further object is to furnish an integrator which may be adapted for varying pressure ranges by simply changing one integrating cam for another.

With the foregoing objects outlined and with other objects in view which will appear as the description proceeds, the invention consists in the novel features hereinafter described in detail, illustrated in the accompanying drawings, and more particularly pointed out in the appended claims.

Figure 1:
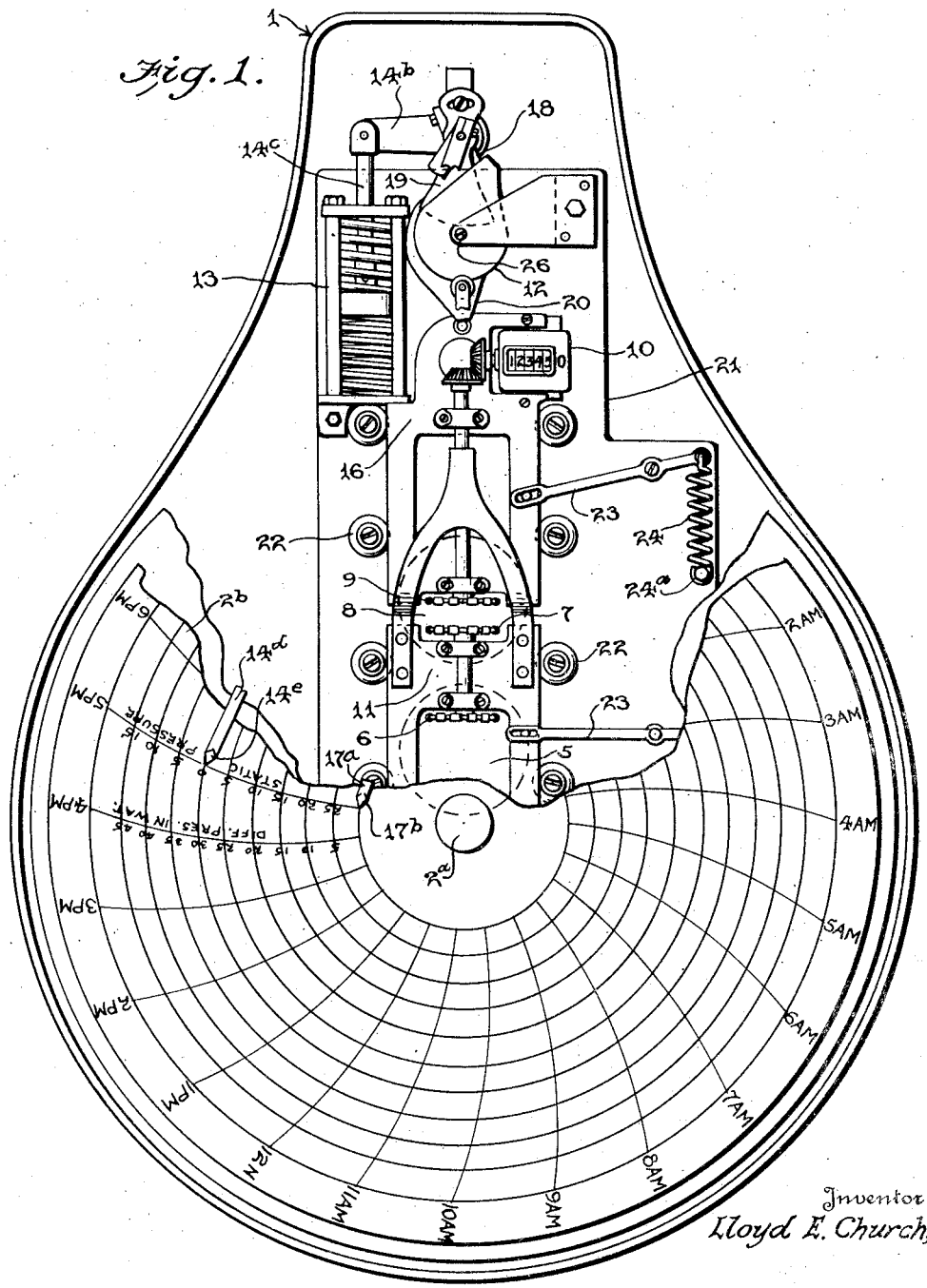
Fig. 1 is a front elevation of the improved apparatus, broken away to facilitate illustration.
Figure 2:
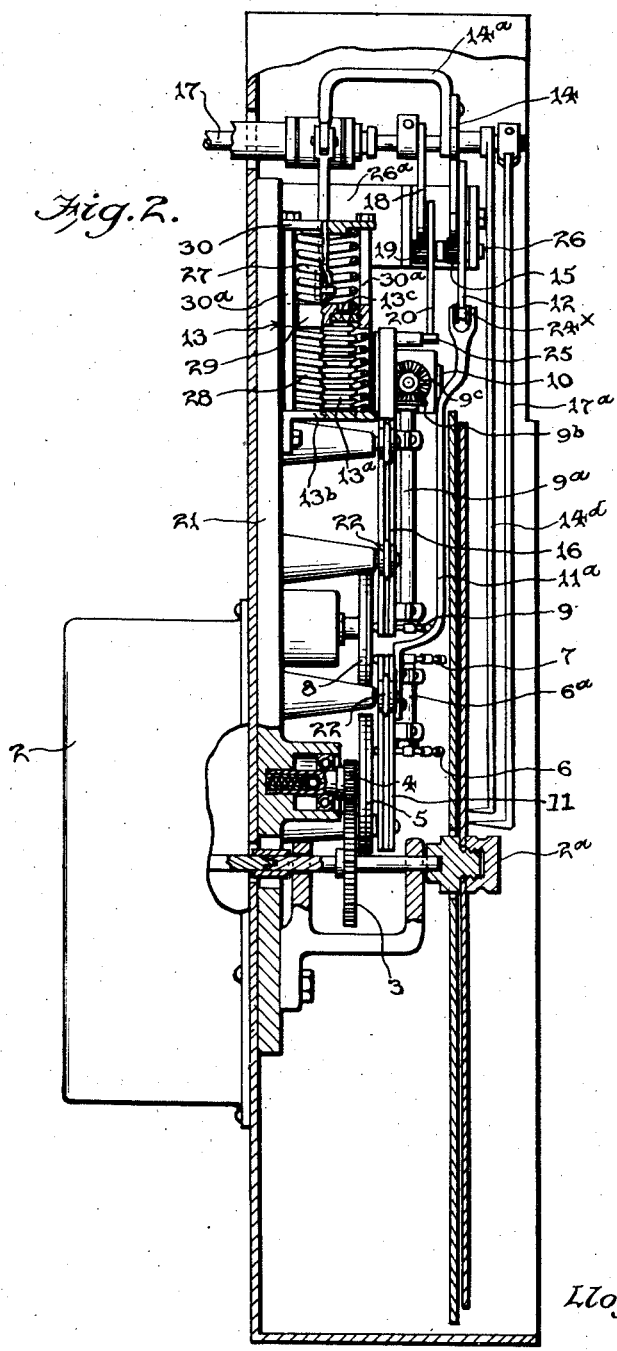
Fig. 2 is a vertical sectional view of the same with certain parts broken away and other parts in elevation.

Referring to the drawings, it will be noted that the instrument comprises a case 1 adapted to contain the integrator mechanism, and to facilitate illustration, the case is shown without a door or covers. A 24-hour clock movement 2 is attached to the back of the case and functions as a prime mover for a chart hub 2a which is detachably connected in the customary manner to an ordinary 24-hour chart 2b on which is permanently recorded the differential and static pressures.

The clock movement also drives a gear 3 which rotates once in a 24-hour period and drives a pinion 4, the ratio between the gear and pinion being 4 to 1. A friction disk 5 is driven by the gear and acts to rotate a friction disk 6 which is preferably integral with a friction wheel 7 that drives a friction disk 8 mounted on a stub shaft carried by the frame of the mechanism. Another friction wheel 9 is fixed to the lower end of a shaft 9a, the upper end of which, by means of meshing bevel gears 9b and 9c drive a conventional counter 10.

At this point it will be noted that the shaft 6a of the friction wheels 6 and 7 rotates in a bracket on the face of a carriage 11 which reciprocates vertically in response to variations in static pressure. To this end, the carriage 11 has an upstanding arm 11a with a roller 24x at its extremity which bears against an integrating cam 12. This cam is fixed to a small gear 15 rotatably mounted on a shaft 26 that is supported by a frame bracket 26a. A segmental gear 14 actuates the pinion 15 and this segmental gear is fixed to a rocking bridge member 14a that is rockably mounted on a shaft 17. An arm 14b, which is fixed to the bridge member, is connected by a link 14c to a suitable static pressure element 13, preferably of the bellows type, and acting in response to variations in the static pressure of the flowing gaseous fluid.

A second vertical reciprocating carriage 16 supports the shaft 9a, as well as the counter 10, and it will be noted that both carriages 11 and 16 are normally urged upwardly by counter-balancing levers 23, one end of each of these levers is connected by a slot and pin connection to the carriage, and its other end is connected to one end of a spring 24, the opposite end of the spring being anchored to the frame, as shown at 24a. This construction causes the roller 24x of the carriage 11 to constantly maintain contact with the metering cam 12, and also causes a roller 25 at the upper end of the carriage 16 to constantly maintain contact with a differential pressure cam 20 which may also be mounted on the shaft 26. It is preferred that the shaft 26 be removable so that a differently shaped cam may be substituted for the cam 12 to accommodate varying pressure ranges.

The cam 20 is also fixed to a pinion 19, driven by a segmental gear 18 which is fixed to the shaft 17; the latter acting in response to a differential pressure element (not shown in the drawings), consisting of the usual mercury U-tube with float or sylphon bellows similar to the static element 13.

At this point it will be noted that the roller disks 6 and 7 are mounted on a carriage which moves radially across the faces of the friction wheels 5 and 8. By this mechanism a variable speed of rotation is given to the friction wheel 8, accordingly as the carriage 11 moves the disks 6 and 7 toward the periphery of wheel 5 and the center of the wheel 8, or vice versa. As the roller disk 9, bevel gears 9b, 9c and counter 10 are all mounted on the carriage 16 which moves radially across the face of the friction wheel 8, the speed of the counter is varied, as this carriage carries the disk 9 from the center to the outer edge of the wheel 8.

The static pressure hand of the marking mechanism is shown at 14d, and it will be noted that it is fixed at one end to the segmental gear 14, and at its other end is provided with a conventional pen 14e for marking the static pressure on the chart.

The differential pressure hand is shown at 17a, and one of its ends is fixed to the shaft 17, and its other end carries a conventional marking pen 17b to record the differential pressure on the chart.

The foregoing correctly describes the essential elements of the new apapratus, and with regard to some of the details, it will be noted that the frame 21 supports all parts of the integrating mechanism, except the shaft 17 and its mountings.

The carriages 11 and 16 are both guided by ball bearing rollers 22 which have flanged peripheries that engage grooves in the side edges of the carriages to permit the carriages to travel vertically on the rollers.

The static pressure element 13 preferably consists of a bellows 13a to the interior of which the static pressure is admitted through the base 13b which is fixed to the frame 21. The top plate 13c of the bellows responds vertically to pressure changes, and this movement is governed by a retarding spring 27 which is compressed when pressure above atmospheric exists in the bellows. Another spring 28 is compressed when the pressure is below atmospheric. An adjustable ring 29, which is threaded to the top 13c may be used to adjust the tension of the spring 28, and a plate 30 which slides on fixed posts 30a is employed to adjust the spring 27.

Operation

At the beginning of a 24-hour run, and at the time the chart is attached to the meter and operation started, the reading on the counter 10 will be marked on the chart 2b by the operator. Assuming no gas is passing through the line, and the static pressure of the gas is at atmospheric, the parts of the mechanism will be in the relative positions shown in the drawings. In such position, the static pressure carriage 11 is standing with its two integral roller disks making drive contact with the friction wheels 5 and 8. Accordingly, friction wheel 5 is driving the wheel 8 at a 1 to 1 ratio. Obviously, this ratio remains constant until such time as the static pressure is increased or decreased. In such event, the bellows 13a will actuate the segment gear 14 so as to cause movement of the integrating cam 12. This cam is turned through its arc, (anti-clock-wise for an increased pressure), and the cam face recedes from the carriage roller, permitting the carriage 11 to rise. This will increase the radius of drive from wheel 5 to disk 6 and decrease the radius of drive from disk 7 to wheel 8. The increase in the ratio of turn from 5 to 8 is in proportion to the increase in gas volume. Should the static pressure drop below atmosphere, the carriage is forced down, decreasing the ratio of drive from 5 to 8, and consequently registering less on the counter 10.

With no gas passing through the orifice, the differential pressure is zero, and accordingly, the differential carriage 16 stands with the disk 9 at the center of wheel 8. Regardless of how fast or how slow disk 8 may be driven by the roller disks from wheel 5, the counter does not register. As a differential pressure is set up by gas passing the orifice, the differential gauge will actuate shaft 17 and through gear segment 18 and pinion 19, swing the integrating cam 20 anti-clock-wise, permitting the differential carriage 16 to raise, thus increasing the radius of drive from wheel 8 to disk 9, and proportionately registering more units on the counter 10 in proportion to the increase in volume passed.

The two carriages are independent of one another and their function for compensating for variations in static pressure and differential pressure and indicating the value of the variables is done correlatively.

At the end of the 24 hour period of run, the counter reading is again taken, and the difference between this reading and the previous reading constitutes the pressure extension for the entire period of the run. The counter illustrated counts by tens. One revolution of the counter shaft registers 100. For closer accounting, for short periods, a counter geared 10 to 1 would be used. Likewise, a reset counter would be geared 10 to 1; but with a meter used continuously, the counting is accumulative and the error in reading fractions of 10 is eliminated.

With regard to the advantages of this device, it will be noted that it is superior to the present method of arriving at volumes when measuring with an orifice meter, as it eliminates the necessity of an operator reading the pen records of the two pressures and calculating or referring to auxiliary charts to obtain the proper extension, several of which are necessary to the calculation of one 24-hour chart. Furthermore, this integrator will always indicate the proper relation of the two pressures with the time, which cannot be the case from the pen records of the charts as the two pens must be out of time with respect to each other to some extent, so that they may pass one another on the chart 2b.

In addition, the improved integrator will indicate more accurately the values of extension than can be possible with a planimeter, or integrating device which depends for its operation on the manual retracing of the chart pen record. The elements of error being the time relation of pen points and operator's lack of skill.

While the improved apparatus is especially useful in connection with the recording of static and differential pressures and integrating their values, it will be recognized by those familiar with precision instruments that the same may be employed wherever useful in correlation with devices for indicating a plurality of forces.

From the above it is believed that the construction, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. In a device of the character described, a movable chart calibrated for the recordation of a plurality of forces, time controlled mechanism for moving said chart, pens cooperating with said chart for recording said forces, first and second devices responsive to variations in said forces for actuating said pens, a counter, means operatively connecting said counter to said time controlled mechanism, the last mentioned means including parts controlled by the movements of said first and second devices for varying the speed at which the counter is driven from said time controlled mechanism.

2. In a device of the character described, a movable chart calibrated for the recordation of static and differential pressures, time controlled mechanism for moving said chart, pens cooperating with the chart for recording said pressures, first and second devices responsive to variations in said pressures for actuating said pens, a counter, means operatively connecting said counter to said time controlled mechanism, the last mentioned means including parts controlled by the movement of said first and second devices for varying the speed at which the counter is driven from said time controlled mechanism.

3. In a device of the character described, a rotatable chart calibrated for the recordation of static and differential pressures, time controlled mechanism for rotating said chart, pens movable over the chart for recording said pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism.

4. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, and means operatively connecting said counter to said time controlled mechanism and including parts controlled by the movements of said first and second devices for varying the speed at which the counter is driven from said time controlled mechanism.

5. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, and means operatively connecting said counter to said time controlled mechanism and including parts controlled by the movements of said first and second devices for varying the speed at which the counter is driven from said time controlled mechanism, the last mentioned means comprising a cam actuated by said first device.

6. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, and means operatively connecting said counter to said time controlled mechanism and including parts controlled by the movements of said first and second devices for varying the speed at which the counter is driven from said time controlled mechanism, the last mentioned means comprising a cam actuated by said second device.

7. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a friction wheel, a reciprocating carriage carrying a disk driven by said wheel, and power transmitting mechanism operatively connecting the disk to the counter.

8. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a friction wheel, a reciprocating carriage carrying a disk driven by said wheel, and power transmitting mechanism operatively connecting the disk to the counter, the counter being mounted on and moving with said carriage.

9. In a device of the character described, a movable chart calibrated for the recordation of static pressures and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a friction wheel driven by the time controlled mechanism, a reciprocating carriage, rotatable disks supported by the carriage, one of the disks engaging the friction wheel, and a second friction wheel driven by the other one of said friction disks.

10. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a cam oscillating in response to movements of one of said devices, a carriage shiftable in response to movements of the cam, and yielding means for holding the carriage in contact with said cam.

11. In a device of the character described, a movable chart calibrated for the recordation of static and differential pressures, time controlled mechanism for moving said chart, pens cooperating with said chart for recording said static pressures and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a frame, guide rollers carried by the frame, a carriage guided by said rollers, an anti-friction member on the carriage, an oscillating cam engaging the anti-friction member, and yielding means for maintaining the anti-friction member in contact with said cam.

12. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a relatively large gear actuated by the time controlled mechanism, a smaller pinion driven by the gear, a first friction wheel driven by the pinion, a second friction wheel, a carriage movable across the faces of the wheels, connected first and second friction disks carried by the carriage, the first disk engaging the friction wheel and being driven thereby, and the second friction disk engaging and driving the second wheel, and means for transmitting power from the second wheel to said counter.

13. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a friction wheel, means for driving the friction wheel from said time controlled mechanism, a carriage movable across the face of said wheel and supporting said counter, a shaft supported by the carriage, and power transmitting means connecting the shaft to the counter for driving the latter.

14. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, said first device including a shaft, a segmental gear rockably mounted on the shaft, an arm rockably mounted on the shaft, a bridge member operatively connecting the arm to said gear, and a pressure responsive element for actuating said arm.

15. In a device of the character described, a movable chart calibrated for the recordation of static pressures and differential pressures, time controlled mechanism for moving said chart, pens cooperating with said chart for recording said static pressures and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, one of the devices which is responsive to variations in pressures, comprising a support, posts carried by the support, adjustable elements on the posts, a bellows on the support provided with a threaded top, a ring having a threaded connection with said top, a spring normally forcing the ring away from said base, a plate movable under the influence of said adjustable elements, and a second spring arranged between said plate and the top for yieldingly urging the top toward said base.

16. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, the last mentioned means comprising a bracket, a cam, and means detachably connecting the cam to said bracket.

17. In a device of the character described, a movable chart calibrated for the recordation of static and differential pressures, time controlled mechanism for moving said chart, pens cooperating with said chart for recording said static and differential pressures, first and second devices responsive to variations in said pressures for actuating said pens, a counter, means operatively connecting said counter to said time controlled mechanism and including parts controlled by the movements of said first and second devices for varying the speed at which the counter is driven from said time controlled mechanism, one of said devices comprising a rock shaft, a segmental gear mounted on and actuated by the rock shaft, and an oscillatable pinion driven by said gear.

In testimony whereof, I hereto affix my signature.

LLOYD E. CHURCH.